UNITED STATES PATENT OFFICE.

WILLIAM RULISON, OF LORAIN, OHIO.

SPRING VEHICLE-WHEEL.

1,222,998.   Specification of Letters Patent.   Patented Apr. 17, 1917.

Application filed September 30, 1916. Serial No. 123,074.

*To all whom it may concern:*

Be it known that I, WILLIAM RULISON, a citizen of the United States, residing at Lorain, in the county of Lorain and State of Ohio, have invented certain new and useful Improvements in Spring Vehicle-Wheels, of which the following is a specification.

This invention relates to spring vehicle wheels of that type having an outer rim cushioned with respect to the inner rim or felly, and has for its object to provide an improved construction for supporting the rim with respect to the felly and for holding and attaching the interposed springs, permitting the outer rim to work radially under impact or shock.

The invention is illustrated in the accompanying drawings.

Figure 1:
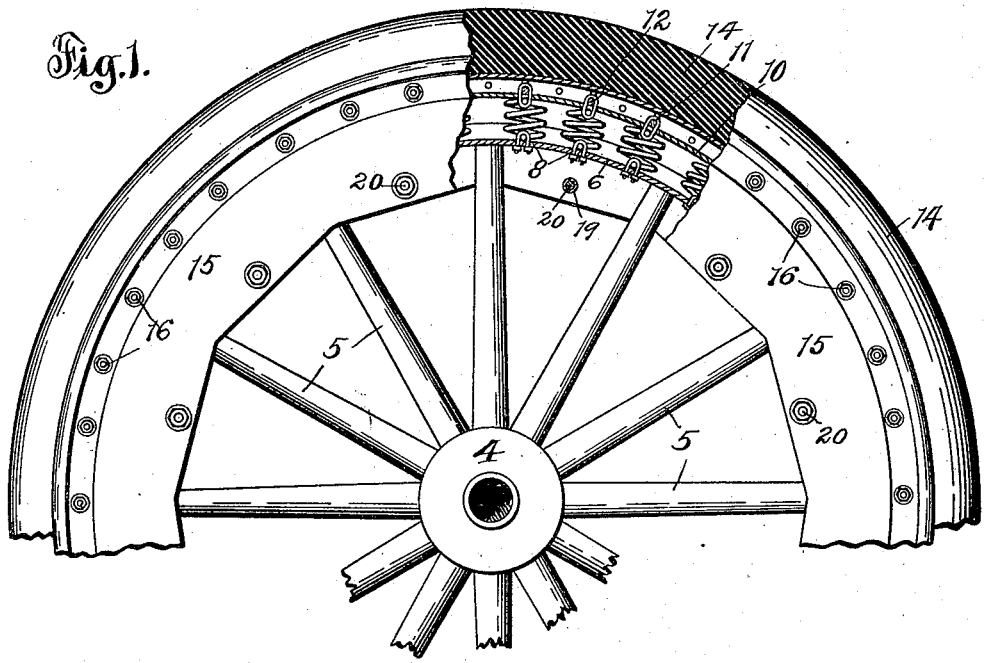
Figure 1 is a partial side elevation of the wheel, partly in section.
Figure 2:
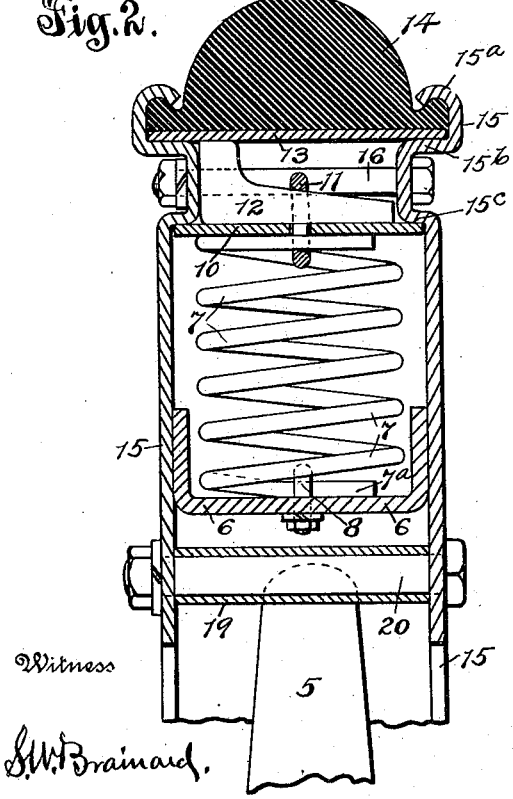
Fig. 2 is a cross-section of the rim and felly.
Figure 3:
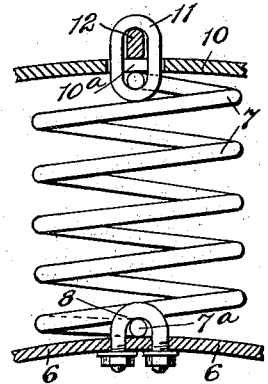
Fig. 3 is a detail showing the devices for attaching the springs.

Referring specifically to the drawings, 4 indicates the hub and 5 the spokes of the wheel. 6 is a felly secured to the spokes and comprising a channel iron with outwardly projecting flanges between which are seated a plurality of radial coil springs 7. The inner ends of these springs are fastened to the felly by U bolts 8 the branches of which extend through holes in the felly.

The outer ends of the springs bear against an intermediate band or ring 10 and are fastened thereto by links 11 which engage the ends of the springs and which extend through openings 10$^a$ in the ring, and are drawn tight by wedges 12 driven laterally into the links on the outer side of the ring 10.

The outer rim of the wheel is indicated at 13 and it supports a cushion tire 14.

The felly and rim structure are inclosed between side plates 15 the outer edges of which have hooks 15$^a$ to engage the flanges of the tire, and also have outer annular shoulders 15$^b$ upon which the felly 13 and tire 14 are seated. These side plates also have inwardly presented shoulders 15$^c$ on which the ring 10 seats, and the plates are connected together, between said shoulders, by spaced bolts 16. Inside of the felly 6 the side plates 15 are also connected by bolts 20, the plates being spaced apart by sleeves 19 on the bolts.

It will be seen that the outer rim structure is firmly clamped between the outer parts of the side plates 15, and all are resiliently supported with respect to the felly 6 by means of the springs 7, and under shock or impact sufficient to compress the springs the side plates 15 will slide in and out beside the felly 6. The springs 7 and the friction between the side plates and the felly will supply a requisite driving connection to prevent creep or travel of the rim with respect to the felly, and outward movement of the rim is prevented by the bolts 20.

What I claim as new is:

1. The combination with a wheel felly and rim, of side plates clamped to the rim and working beside the felly, an intermediate band spaced from the rim and abutting against said side plates, springs between said band and felly, and fastening devices for said springs, located in the space between said rim and band and retained in engagement with the springs by the side plates.

2. The combination with a wheel felly and rim of side plates clamped to the rim and extending beside the felly, said plates having outer shoulders on which the rim seats, and also having inner shoulders, an intermediate band resting against said inner shoulders, and springs between said band and felly.

3. The combination with a wheel felly and rim of side plates clamped to the rim and extending beside the felly, said plates having outer shoulders on which the rim seats and also having inner shoulders, an intermediate band resting against said inner shoulders, and springs between said band and the felly, said springs being connected at opposite ends to the band and felly respectively.

4. The combination with a wheel felly and rim, of side plates clamped to the rim and working beside the felly, an intermediate band abutting against said side plates, springs between said band and the felly, links connecting the outer ends of the springs and the band, and wedges engaging the links on the outer side of the band, said wedges being between the side plates and within the rim.

5. The combination with a wheel felly and rim, of side plates engaging the rim and extending beside the felly, said plates having outer shoulders on which the rim rests and inner shoulders spaced therefrom, a band abutting against said inner shoulders, bolts connecting the plates between the rim and the band, and springs between the felly and the band.

In testimony whereof, I do affix my signature in presence of two witnesses.

WILLIAM RULISON.

Witnesses:
JOHN A. BOMMHARDT,
S. W. BRAINARD.

Copies of this patent may be obtained for five cents each, by addressing the "Commissioner of Patents, Washington, D. C."